June 11, 1935.  A. CROSSLEY  2,004,368
RADIO POWER SUPPLY SYSTEM
Filed Aug. 24, 1933
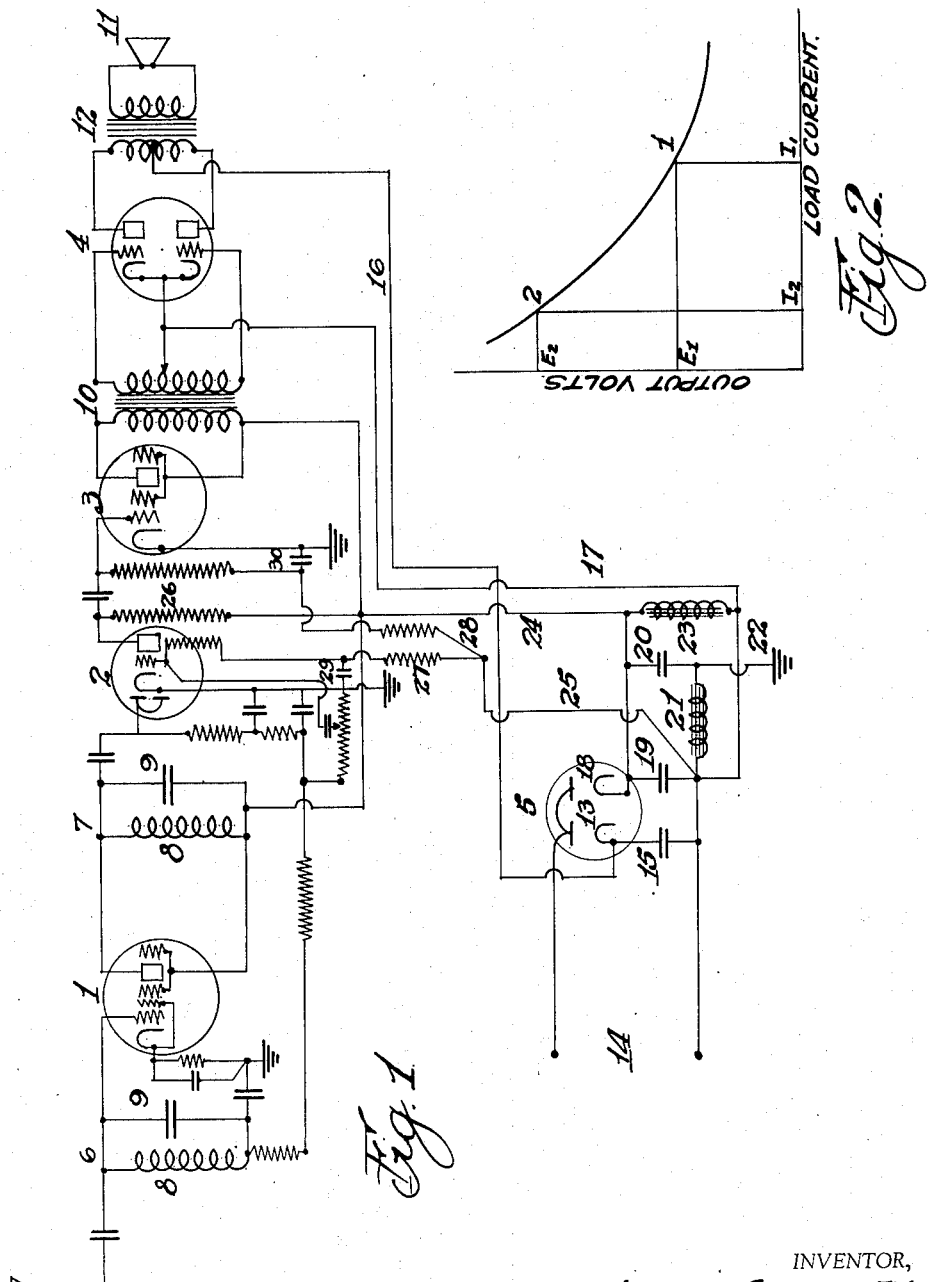
INVENTOR,
ALFRED CROSSLEY,
BY
ATTORNEY.

Patented June 11, 1935

2,004,368

UNITED STATES PATENT OFFICE 2,004,368

RADIO POWER SUPPLY SYSTEM

Alfred Crossley, Chicago, Ill., assignor to Johnson Laboratories, Inc., Chicago, Ill., a corporation of Illinois Application August 24, 1933, Serial No. 686,523

9 Claims. (Cl. 250—27)

My invention relates to radio receiving apparatus, and more particularly to those receivers which are designed to be operated directly from house lighting circuits without the use of a high-voltage transformer. Receivers of this class are usually arranged to be used either on direct current or on alternating current supply, and the transformer which might be used on the alternating current supply is omitted, not only as a matter of economy, but also in order that the receiver may be used on direct current supply. The omission of the transformer decreases the direct current voltage delivered by the rectifier to the vacuum tubes, and particularly the voltage delivered to the output tube. The types of vacuum tube normally used in the output stage in such receivers, would give their best performance at plate voltages considerably higher than those that can be obtained from the lighting supply circuit without the use of a transformer. Moreover, because of this decreased voltage on the output tube, and also because of the load characteristics of the output tubes now commonly employed when connected in the conventional manner, there is frequently a serious reaction between the output tube and the other tubes in the receiver when the load current in the output tubes fluctuate over wide limits due to changes in the degree of modulation on the incoming signal. This reaction operates to change voltages on the plates of the preceding vacuum tubes, which in turn changes their amplification and thus produces serious distortions in the output circuit and loud-speaker.

Another difficulty in the circuits now commonly employed, is that the load characteristics of the output tubes are such as to materially decrease the plate voltage delivered to the output tube from the rectifier system. This is because, as the output tubes are commonly connected, there is a very considerable load current in the plate circuit of the output tube, even when there is no modulation voltage present on the grid of the output tube. This load current decreases the voltage delivered by the rectifier.

One principal object of my present invention, is to provide a system in which the two difficulties just mentioned are eliminated or at least materially reduced. Thus, by means of the method of connection about to be described, and although no new component parts are involved, a considerably greater power output from the output tube can be obtained without serious distortion due to reaction between the output tube and the other tubes in the receiver. Additional objects of the invention, which include providing a system that will deliver considerably greater sound outputs than are possible in any of the present systems, will be clear from what is to follow.

The detrimental load characteristics of the output tube are inherent in the system of amplification known as Class A. In amplifiers of this class, there is a very considerable plate current in the plate circuit of the output tube, even when there is no modulation voltage on the grid of the tube, and when the modulation voltage rises, the plate current normally remains substantially constant.

In the system of amplification known as Class B, however, the plate current is very small when there is no modulation voltage on the grid, and the plate current rises proportionally as the modulation voltage increases. In the present invention, advantage is taken of the load characteristics of tubes operated as Class B amplifiers, and the employment of this class of amplification, in the output tube, is one essential element of the improvement herein described and claimed.

The reactions between the output tube and the other tubes in the receiver, which cause the serious distortions which it is an object of this invention to avoid, arise in the rectifier system. If the connections between the rectifier system and the plate circuits of the various tubes are such that changes in the load current of one tube will affect the plate voltage supplied to each of the other tubes, it is impossible to prevent reaction and resulting distortion whenever the fluctuations in the plate current of any one tube are at all large. The output tube is, of course, the worst offender in this respect, since the changes in its plate current are normally much greater than those occurring in the plate circuit of any other tube.

The rectifier tubes commonly employed in receivers of the class here under consideration, normally have two cathodes and two plates, but they are so connected as to permit the reactions above described with the result that the power that can be delivered by the output tube is definitely limited by the electrical connections used.

Proceeding now to a description of the arrangements by which the above-mentioned and other desirable objects are attained, I show in Fig. 1 a schematic wiring diagram of a broadcast receiver which is illustrative of one embodiment of the invention. This receiver has five vacuum tubes. The first tube 1 is a radio-frequency amplifier, the second tube 2 is a detector, the third tube 3 is a first stage of audio-frequency amplification, the fourth tube 4 is an output power amplifier, and the fifth tube 5 is a rectifier. The tube 1 is shown as a screen grid tetrode, the tube 2 is shown as a diode-triode type of detector, the tube 3 is shown as a pentode, the tube 4 is shown as a double triode, and the tube 5 is shown as a double rectifier. These are the types of tubes commonly employed at the present time in receivers of the class herein considered, but it is to be understood that other types of tubes could be employed in systems embodying my present invention without sacrificing the advantages or departing from the scope thereof. For example, the tube 4, shown as a double Class B amplifier, might consist of two single Class B amplifiers, and the tube 5, shown as a double rectifier, might consist of two single rectifiers. These substitutions could be made, moreover, without in any way altering the connections shown in the drawing.

The radio-frequency portion of the receiver consists of an input tuned circuit 6 connected to the control grid of the first vacuum tube 1, and an interstage tuned circuit 7 connected to the diode-triode detector 2. Each tuned circuit consists of an inductance 8 and a condenser 9, either or both of which may be made variable for purposes of tuning. The antenna is connected through a suitable condenser to the first tuned circuit 6 and to the grid of the first vacuum tube 1. These connections are such as are commonly employed, but are capable of considerable variation, depending upon the type of receiver in which the present invention is to be employed.

Similarly, the coupling between the detector tube 2 and the first audio-frequency tube 3, is illustrated as of the resistance type, but this also is capable of modification without in any way altering the particular arrangements and connections which form the basis of the present invention.

The transformer 10 furnishes low impedance output to the Class B power output tube 4, which in turn furnishes power to the reproducer 11 through the output transformer 12.

The power supply consists of a vacuum tube 5 which has two rectifier units, although, as already noted, it might equally well employ two separate rectifier tubes. The first rectifier unit has connected between its cathode 13 and one side of the power supply 14, a high-capacity condenser 15. Connection is made across this condenser by the conductors 16 and 17 to the plate circuit of the double output tube 4 through the mid taps on the secondary of the input transformer 10 and the primary of the output transformer 12. It will be noted that there is no reactance or choke coil, such as is commonly employed, in the output circuit of this first rectifier unit. In lieu of this choke coil and also for other reasons which will presently appear, the size of the condenser 15 is materially increased over the sizes commonly employed, being preferably of the order of 25 microfarads.

The second rectifier unit has connected between its cathode 18 and one side of the power supply 14, a condenser 19. Across this condenser is connected a second condenser 20 in series with a filter choke coil 21, the junction of the second condenser 20 and the choke coil 21 being grounded at 22.

Also connected across the condenser 19 is the field coil 23 of the reproducer 11. Voltage supply for the radio-frequency tube 1, the detector tube 2, and the first audio-frequency tube 3, is obtained from the filter circuit 19, 20, 21, 23, by conductors 24, 25. Conductor 24 goes through the tuning coil 8 to the plate of the tube 1, through the resistance 26 to the plate of the detector tube 2, and through the primary of the transformer 10 to the plate of the first audio-frequency tube 3. Connection 25 includes additional filter resistances 27, 28 and filter condenser 29, 30, and goes through additional circuit elements later to be described to the control grids of the radio-amplifier tube 1, the triode portion of the detector tube 2, and the grid of the first audio-frequency tube 3. The grounding of the junction between the condenser 20 and the choke coil 21 provides negative bias voltage on the grids of the tubes 1, 2 and 3.

It will be understood that there may be various modifications of the filter arrangements in the output circuit of the second rectifier unit. For example, the filter choke may be inserted in the positive side of the voltage supply, adjacent to the cathode. This modification and similar modifications may be made in cases where they seem desirable, without in any way sacrificing the advantages or departing from the scope of the invention.

In the diagram, Fig. 1, the filament connections for the vacuum tubes are not shown. These filaments will normally be connected in series across the supply line with a suitable resistor to regulate the current through the filament to the correct value.

As has already been pointed out, it is a characteristic of Class B amplifiers that, when there is no audio-frequency voltage on the grids of such amplifier tubes, the plate current is very small. Under these conditions, and with connections as shown in Fig. 1, the effective voltage on the plates of the output tube 4 will closely approach the peak voltage of the supply line 14, which will be approximately 162 volts for 115 volts R. M. S. line voltage. When an audio-frequency voltage appears on the grids of the tube 4, there will be an increase in the plate current with a resultant slight drop in the plate voltage delivered by the rectifier. However, only excessively large peaks of audio-frequency voltages on the grids will be sufficient to greatly decrease the plate voltage on the output tube 4, and since these excessively large audio-frequency peaks occur only at rare intervals, the average effective plate voltage on the output tube 4 will remain high. Actual measurements have indicated that, with a line voltage of 115 R. M. S., the effective plate voltage on the output tube is approximately 155, and even under maximum load conditions this voltage drops to approximately 145 volts.

The voltage conditions in the output tube of a system connected as just described, are contrasted with the voltage conditions occurring in a Class A amplifier connected in the usual manner, in Fig. 2. In this figure, the horizontal axis is the load current on the rectifier, and the vertical axis is the output voltage. The curve 1, 2, is typical for rectifier tubes of the class herein considered. The point 1 corresponds to the very considerable plate current of a Class A amplifier, even when no modulation voltage is present on the grid. This current $I_1$ corresponds to an output voltage $E_1$.

As against this, point 2 indicates the conditions with a Class B amplifier tube. Here the load current $I_2$ is considerably smaller and corresponds to an output voltage $E_2$ considerably higher than $E_1$. Laboratory measurements have shown that, with the output and rectifier tubes connected in the conventional manner, the normal plate voltage on a pentode output tube is approximately 95 volts with 115 volts R. M. S. on the A. C. line. In this instance, the total overall voltage, including the bias voltage for the grid circuit of the pentode tube and the losses in the filter circuit, was approximately 115 volts.

It will be seen that the condenser 15, which is considerably larger than the filter condensers normally employed, is charged through the rectifier unit 13 up to a voltage closely approaching the peak voltage of the A. C. supply line 14. Because of its large capacity, it is capable of storing an amount of energy sufficient to maintain the voltage momentarily without serious drop during peaks of audio-frequency voltage on the grids of the output tube 4. Because of the large size of the condenser 15, and because the total load current on the rectifier unit 13, which supplies the output tube 4 only, is very small, no filter choke is necessary, the condenser alone accomplishing an adequate suppression of the A. C. ripple.

Because of the employment of Class B amplification, and also because of the materially higher plate voltage available on the plates of the output tube 4, the output circuit is capable of delivering considerably more power to the reproducer 11 than can be obtained in the conventional method of connection without serious distortion. This increased output is partly due to the higher efficiency of the output tube, and partly due to the increased effective plate voltage.

When a receiver connected as illustrated in Fig. 1, is operated on a direct current supply, the voltage drop through the rectifier units 13, 14, is very small, and because the rectifier unit 13 is connected only to the plate supply of the output tube 4, the plate voltage delivered to the tube 4 is materially higher than it would be in the conventional arrangement in which the plate currents of several tubes all pass through the same rectifier unit. Thus, although the plate voltage actually delivered to the output tube is smaller when the receiver is operated from a direct current source, the advantages of the system are still present. Because of the separate power supply unit for the output tube, there is no possibility of reaction between the output tube and the other tubes of the receiver. Also, because the output tube is arranged for Class B amplification, the load current is normally small and the effective voltage delivered at the plates of the tube is correspondingly high.

Having thus described my invention, what I claim is:

1. A radio receiver including a detector and amplifying stages, a power output stage having substantially zero plate current with no audio-frequency input voltage, a circuit including a first rectifier element and a filter system for supplying plate voltage to said detector and amplifying stages, and a second circuit containing a rectifier element and a condenser for supplying plate voltage to said power output stage.

2. A radio receiver including a detector and amplifying stages, a power output stage having anode and cathode electrodes and having low plate current for small audio-frequency input voltages and including a winding connected between said anode electrodes, a circuit including a first rectifier element and a filter system, arranged to be connected across an alternating or direct current supply line, for supplying plate voltage to said detector and amplifying stages, and a second rectifier element and a condenser arranged to be connected in series across said alternating or direct current supply line, the terminals of said condenser being connected respectively through one half of said winding to each of said anode electrodes and directly to said cathode electrodes of said power output stage, whereby said detector and amplifying stages are unaffected by plate current fluctuations in said power output stage.

3. A radio receiver including a detector and amplifying stages, a power output stage having anode and cathode electrodes and having low plate current for small audio-frequency input voltages and including a winding connected between said anode electrodes, a circuit including a first rectifier element and a filter system arranged to be connected across an alternating or direct current supply line, for supplying plate voltage to said detector and amplifying stages, and a second rectifier and a condenser arranged to be connected in series across said alternating or direct current supply line, the terminals of said condenser being connected respectively through one half of said winding to each of said anode electrodes and directly to said cathode electrodes of said power output stage, whereby the effective plate voltage on said power output stage tends to approach the maximum voltage of said supply line.

4. A radio receiver including a detector and amplifying stages, a power output stage having low plate current for small audio-frequency input voltages, a circuit including a first rectifier element and a filter system for supplying plate voltage to said detector and amplifying stages from an alternating or direct current supply line, a second rectifier element and a condenser arranged to be connected in series across said alternating or direct current supply line for supplying to said power output stage plate voltage undecreased by the voltage drop due to said filter system, whereby the effective plate voltage on said power output stage is not less than eighty per cent. of the maximum voltage of said supply line.

5. A radio receiver including a detector and amplifying stages, a power output stage having anode and cathode electrodes and having low plate current for small audio-frequency input voltages and including a winding connected between said anode electrodes, a circuit including a first rectifier element for supplying plate voltage to said detector and amplifying stages from an alternating or direct current supply line, and a second rectifier element and a condenser arranged to be connected in series across said alternating or direct current supply line, the terminals of said condenser being connected respectively through one half of said winding to each of said anode electrodes and directly to said cathode electrodes of said power output stage, whereby said detector and amplifying stages are unaffected by plate current fluctuations in said power output stage and whereby the effective plate voltage on said power output stage tends to approach the maximum voltage of said supply line.

6. A radio receiver including a detector and radio and audio-frequency amplifying stages, a Class B amplifier power output stage having anode and cathode electrodes and including a winding connected between said anode electrodes and a circuit including a first rectifier element and a filter system for supplying plate voltage to said detector and amplifying stages, and a second rectifier element and a condenser, the terminals of said condenser being connected respectively through one half of said winding to each of said anode electrodes and directly to said cathode electrodes of said power output stage.

7. A radio receiver including a detector and high and low frequency amplifying stages, a Class B amplifier power output stage, and separate rectifiers, arranged to be connected to an alternating or direct current supply line, for supplying plate voltage to said detector and amplifying stages and to said power output stage respectively, and filtering arrangements for the rectifier supplying said power output stage such that the effective plate voltage on said power output stage tends to approach the maximum voltage of said supply line.

8. A radio receiver including a detector and high and low frequency amplifying stages, a Class B amplifier power output stage, and separate rectifiers, arranged to be connected to an alternating or direct current supply line, for supplying plate voltage to said detector and amplifying stages and to said power output stage respectively, and filtering arrangements for the rectifier supplying said power output stage such that the effective plate voltage on said power output stage is not less than eighty per cent. of the maximum voltage of said supply line.

9. A radio receiver including a detector and high and low frequency amplifying stages, a Class B amplifier power output stage, and separate rectifiers, arranged to be connected to an alternating or direct current supply line, for supplying plate voltage to said detector and amplifying stages and to said power output stage respectively, and filtering arrangements for the rectifier supplying said power output stage such that said detector and amplifying stages are unaffected by plate current fluctuations in said power output stage.

ALFRED CROSSLEY.